United States Patent [19]

Johnson et al.

[11] Patent Number: 5,750,937
[45] Date of Patent: May 12, 1998

[54] MULTI-LOAD CELL FORCE SENSING APPARATUS

[75] Inventors: Thomas H. Johnson, Winnebago; Gene L. Justice; Michael W. Lundgreen, both of Fairmont, all of Minn.

[73] Assignee: Weigh-Tronix, Inc., Fairmont, Minn.

[21] Appl. No.: 612,143

[22] Filed: Mar. 7, 1996

[51] Int. Cl.$^6$ .............................. G01G 19/22; G06F 3/00
[52] U.S. Cl. ...................... 177/25.11; 177/25.13; 177/199; 364/709.11
[58] Field of Search .................. 364/709.01, 709.09, 364/709.1, 709.11; 177/25.11, 25.12, 25.13, 25.14, 25.19, 199, 200

[56] References Cited

U.S. PATENT DOCUMENTS

| | | | |
|---|---|---|---|
| 3,712,395 | 1/1973 | Streater et al. | 177/210 |
| 3,885,427 | 5/1975 | Melcher et al. | 177/210 FP |
| 4,075,887 | 2/1978 | Gallo | 73/141 R |
| 4,139,070 | 2/1979 | Hanson et al. | 177/200 |
| 4,237,988 | 12/1980 | Blawert et al. | 177/189 |
| 4,375,243 | 3/1983 | Doll | 177/25.11 |
| 4,387,777 | 6/1983 | Ash | 177/262 |
| 4,526,247 | 7/1985 | EerNisse et al. | 177/210 FP |
| 4,804,052 | 2/1989 | Griffen | 177/25.14 |
| 4,848,477 | 7/1989 | Oldendorf et al. | 177/25.14 |
| 4,909,338 | 3/1990 | Vitunic et al. | 177/50 |
| 5,036,715 | 8/1991 | Hanson et al. | 73/862.59 |
| 5,296,655 | 3/1994 | Sargent et al. | 177/199 |
| 5,313,023 | 5/1994 | Johnson | 177/229 |
| 5,336,854 | 8/1994 | Johnson | 177/229 |
| 5,367,129 | 11/1994 | Luhl, Jr. | 177/229 |
| 5,391,844 | 2/1995 | Johnson et al. | |
| 5,567,918 | 10/1996 | Bachmann et al. | 177/25.13 |

OTHER PUBLICATIONS

Measurements Group, Tech Note "Errors Due to Wheatstone Bridge Nonliearity", 1982.

*Primary Examiner*—Michael L. Gellner
*Assistant Examiner*—Randy W. Gibson
*Attorney, Agent, or Firm*—Gray Cary Ware & Freidenrich

[57] ABSTRACT

A multi-load cell force sensing apparatus includes a plurality of load cells supporting an operating surface and a controller which determines the position, as well as the magnitude, of an applied force relative to the operating surface. Impulse forces may be distinguished from static forces, thereby enabling the apparatus to function as a user input device whereby a user may request the apparatus to perform functions by pressing or touching a specified location on the operating surface.

34 Claims, 6 Drawing Sheets

MULTI-LOAD CELL FORCE SENSING APPARATUS

FIELD OF THE INVENTION

The invention is directed to a force sensing apparatus using multiple load cells to sense an applied force. More particularly, the invention is directed to a force sensing apparatus in which multiple load cells may be used to determine the position as well as the magnitude of an applied force.

BACKGROUND OF THE INVENTION

Multi-load cell force sensing apparatus such as scales have been used in various environments to measure applied force. For example, the use of multiple load cells is advantageous in heavy capacity weighing applications since the applied force may be borne and sensed by a plurality of lower capacity load cells, rather than using a single, large capacity load cell. Lower capacity load cells tend to be less expensive than large capacity load cells, and they also tend to have greater accuracy and precision.

The total applied force in a multi-load cell environment is in theory the sum of the force signal outputs of the load cells. However, it has been found that the sensitivity of some load cells may vary from cell to cell, and that coupling effects due to mounting may also affect individual load cell sensitivities. As a result, the force reading output of a multi-load cell force sensing apparatus may vary depending upon the position of an applied force on the apparatus.

Attempts have been made to adjust the sensitivities of individual load cells to compensate for changes in position of an applied force, e.g., by connecting sensitivity reducing resistors to the output circuits of individual load cells. U.S. Pat. No. 4,804,052 to Griffen discusses multiplying the digital outputs of load cells by load position correction factors prior to summing the outputs to compensate for load position. The correction factors are determined in calibration by placing a known weight at a plurality of positions (equal to the total number of load cells in the apparatus), and then solving the resulting simultaneous equations. Griffen also discusses the use of a local area network to connect the load cells to a master controller, such that the outputs of the load cells may be obtained independently and free from interaction between individual cells. User interaction with the Griffen apparatus occurs through a separate keyboard.

Correction of a scale output for position has several advantages, most important of which is to eliminate the dependence of the force reading of the scale on the position of a weight on the scale. However, it would also be useful in many applications and environments to be able to calculate the position of a force on the scale.

Therefore, a need exists in the art for a force sensing apparatus which determines the position, as well as the magnitude, of an applied force.

SUMMARY OF THE INVENTION

The invention addresses these and other problems associated in the prior art in providing a multi-load cell force sensing apparatus which determines the position, as well as the magnitude, of an applied force relative to an operating surface to which the force is applied. Position sensing may have many advantages in weighing applications and the like. For example, determining the position of an applied force may be used to sort objects, to calculate postal rates for different postage classes or delivery zones, to detect objects which fall outside of a desired specification, to oversee the status of an industrial process, etc.

Moreover, in preferred embodiments, impulse forces applied to a force sensing apparatus may be distinguished from static forces, thereby enabling the apparatus to determine the position of an impulse applied to the operating surface, e.g., due to a user applying a force to the operating surface with the hand or foot. Such a feature permits an apparatus to function as a user input device, whereby a user may select the apparatus to perform specified functions merely by touching the operating surface at a specified location.

Therefore, in accordance with one aspect of the invention, a force sensing apparatus is provided, which includes an operating surface for receiving an applied force, the applied force having a magnitude and a position relative to the operating surface; a plurality of load cells, each receiving at least a portion of the applied force on the operating surface and providing a force value representative thereof; magnitude sensing means, coupled to receive the force values from the load cells, for determining the magnitude of the applied force; and position sensing means, coupled to receive the force values from the load cells, for determining the position of the applied force.

In accordance with another aspect of the invention, a scale is provided, which includes a platter having an operating surface defined thereon for receiving an applied force; a plurality of load cells supporting the platter, each load cell providing a force value representative of at least a portion of the applied force; and a controller, coupled to receive the force values from the load cells. The controller includes static force magnitude sensing means for determining the magnitude of a force applied by a weight received on the platter; static force position sensing means for determining the position of the weight on the platter; and impulse position sensing means for detecting an impulse force applied to the platter and determining the position of the impulse force on the platter.

In accordance with an additional aspect of the invention, a method is provided for operating a multi-load cell scale of the type having a platter supported by a plurality of load cells. The method includes the steps of sensing the weight of an object placed on the platter; determining the position of a user impulse applied to the platter; and performing a predetermined function in response to a user impulse received in a predetermined area of the platter.

These and other advantages and features, which characterize the invention, are set forth in the claims annexed hereto and forming a further part hereof. However, for a better understanding of the invention, its advantages and objectives attained by its use, reference should be made to the Drawing, and the following descriptive matter, where a preferred embodiment of the invention is described.

DETAILED DESCRIPTION OF THE PREFERRED EMBODIMENTS

Figure 1:
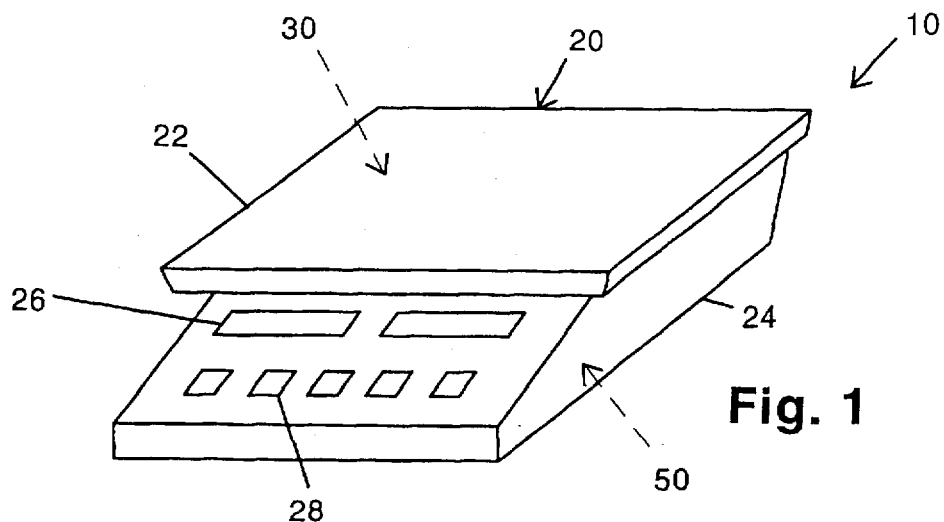
FIG. 1 is a perspective view of a preferred multi-load cell force sensing apparatus consistent with the invention.

Turning to the Drawing, wherein like parts are denoted by like reference numbers throughout the several views, FIG. 1 shows a preferred scale 10 consistent with the principles of the invention. Scale 10 generally includes an operating surface 20 defined by a platform 22, and supported by a plurality of load cells 30 housed in a base 24. User interface is performed through an input device such as keyboard 28 and a display such as display 26, and primary control is provided by a control system 50. The input device 28, display 26 and control system 50 are shown incorporated within base 24, although each may also be external to the base of the scale.

Preferred embodiments of the invention are designed to receive applied forces on an operating surface which is supported by a plurality of load cells such that the load cells receive at least a portion of the applied force. The applied forces may be weights, but they may also represent acceleration forces, impact forces, torques, angular forces, angular acceleration forces, or any other known force which is capable of being measured. In addition, the applied forces may include forces initiated by a user manually manipulating the operating surface (e.g., as a user input, such as pressing the surface to request an operation to be performed by the scale).

By an "operating surface", what is meant is a structure upon which an applied force is received. An operating surface may be disposed on a particular member, such as platter 22 in FIG. 1, and may take any contour consistent with its function. However, an operating surface may also be defined by force-receiving structure on the load cells, or by any structure which is capable of transmitting the applied force to the load cells. Therefore, the use of a separate member for an operating surface in the preferred embodiments should not be construed as requiring a separate physical object to be used for the operating surface.

By "load cell", what is meant is a force measuring assembly which is capable of providing a force measurement or output in response to a force applied thereto. The precise structure of a load cell will vary depending upon the type of force being measured, as well as the accuracy and precision required for the particular environment in which the load cell is used.

Figure 2:
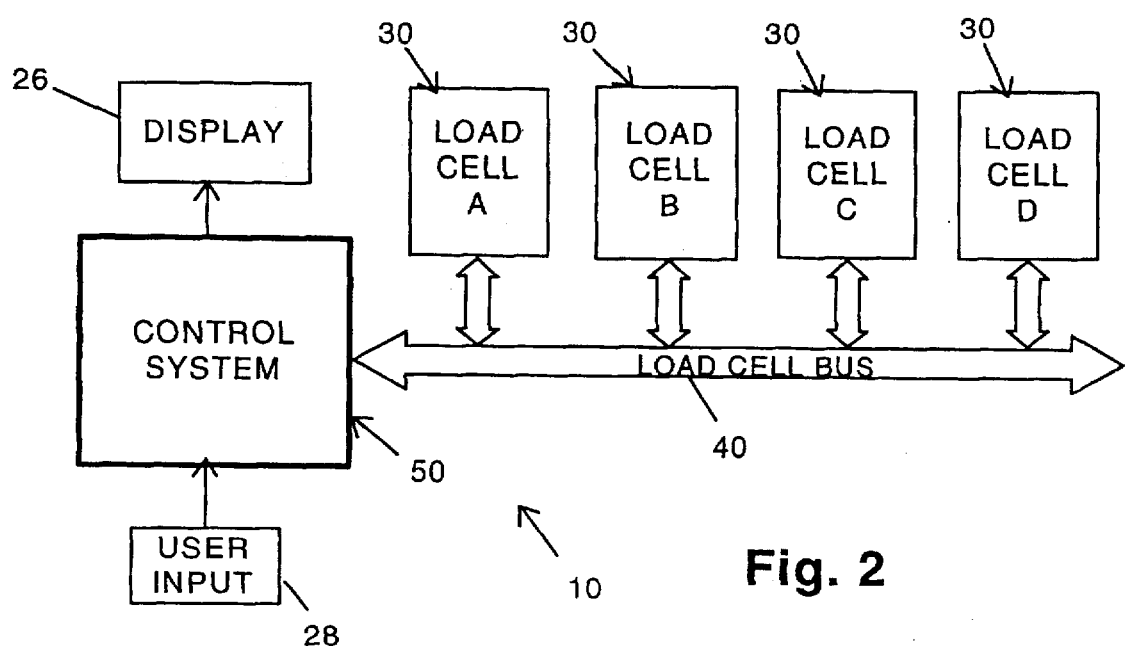
FIG. 2 is a functional block diagram of the primary components in the apparatus of FIG. 1.

FIG. 2 shows a block diagram of the functional components of scale 10. Scale 10 is controlled by a controller or control system 50, which handles the primary operational functions of the scale. Control system 50 drives display 26, and preferably receives some user input from user input device 28. As will be discussed below, additional user input may be provided by a user touching or pressing on operating surface 20.

Control system 50 preferably handles data exchange with a plurality of load cells 30 over a common bus 40. This configuration is generally known as a master/slave configuration, whereby data communication is coordinated by control system 50 acting as a master controller. Each load cell 30 sends or receives information across bus 40 only in response to a command sent out by control system 50. As will be discussed in greater detail below, several communications protocols may be used to handle the information exchange between control system 50 and load cells 30.

Principles of Operation

Figure 3:
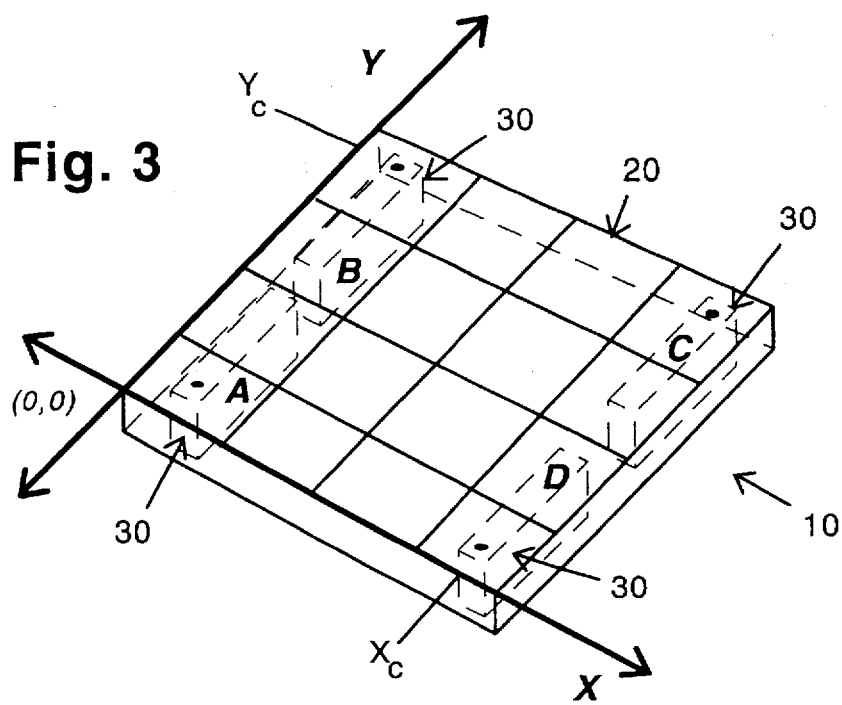
FIG. 3 is a functional perspective view of the operating surface and load cells in the apparatus of FIG. 1, showing X–Y coordinates overlaid thereon for illustrating the principles of operation for the apparatus.

FIG. 3 is a functional perspective view of scale 10 for illustrating the principles of operation of the preferred embodiments of the invention. Scale 10 is shown having an operating surface 20 supported by a plurality of load cells 30, in this case four load cells also designated A, B, C and D. An X-Y coordinate system is shown generally overlaying operating surface 20, with the origin (x=0, y=0) being located at the corner of the operating surface proximate load cell A.

Preferred embodiments of the invention rely on the basic premise that the sum of the reactive moments exhibited by a plurality of load cells supporting an operating surface will be equal to the total moment applied to the operating surface. This relationship is generally valid whether looking at the total moments, or at the moments only along one axis. This premise permits the position of both the load cells and weights or forces applied to the operating surface to be determined after certain characteristics of each load cell are calculated.

In theory, the overall magnitude of a force W applied to the operating surface of a multi-load cell system is simply the sum of the forces measured by all of the load cells. For example, for N load cells, the overall force W is:

$$W = \sum_{i=1}^{N} F_i \tag{1}$$

where $F_i$ is the force value output by a load cell i. In FIG. 3, load cell A corresponds to i=1, load cell B corresponds to i=2, load cell C corresponds to i=3, and load cell D corresponds to i=4.

However, it has been found that in actual multi-load cell systems, some errors may exist in the force measurements of the individual load cells due to mounting effects, or imperfections in the installation of the load cells, e.g., due to parallel spring effects from objects attached to the system, unleveled mounting of the load cells, or lever effects. These imperfections may result in varying the overall force measurement depending upon the location of the force applied to the operating surface. Therefore, it has been found that each force value from a load cell must be scaled by a span correction factor to correct for these imperfections and thereby generate proper overall force measurements independent of the position of a force on the operating surface. As a result, the overall magnitude of the force W corrected for span effects becomes:

$$W = \sum_{i=1}^{N} F_i s_i \quad (2)$$

where $s_i$ is the span correction factor for a load cell i, and each term $F_i s_i$ is a span corrected force value.

To calculate the span correction factors, N calibration forces are applied to the operating surface to generate force measurements for each load cell. Each calibration force, $W_j$ (with j=1 to N) may be used to generate an equation:

$$W_j = \sum_{i=1}^{N} F_{i,j} s_i \quad (3)$$

With each calibration force $W_j$ and each measured force $F_{i,j}$ known, the N unknown span correction factors may be determined by solving the N resulting simultaneous equations. Preferably, the calibration forces are a single, known weight placed on the operating surface at different locations, e.g., proximate each load cell. However, differently sized and/or placed calibration forces may also be used.

The effective positions of the load cells along each axis relative to the operating surface ($X_i, Y_i$) may also be calculated as characterizing information for the load cells. For example, FIG. 3 shows the coordinates ($X_c, Y_c$) representing the effective position of load cell C. In some circumstances, the effective positions of the load cells may be determined by measuring their point of mounting on the operating surface. However, on many types of load cells, the effective positions of the load cells may not be precisely at the points of mounting due to levering effects of the load cell mounts or other effects.

Similar to the determination of the span correction factors, N known calibration forces must be applied to the operating surface to generate calibration data for determining the position of each load cell. The calibration forces $W_j$ must be applied at known locations ($x_j, y_j$), preferably one proximate each load cell. Determination of the load cell positions may be performed based upon the assumption that under stationary conditions, the sum of the reactive moments exhibited by the load cells along each axis will be equal to the total moment applied to the operating surface along each axis. Therefore, the position $x_j$ and $y_j$ for each applied calibration force may be calculated to be:

$$x_j = \frac{\sum_{i=1}^{N} F_{i,j} s_i X_i}{W_j} \quad (4)$$

$$y_j = \frac{\sum_{i=1}^{N} F_{i,j} s_i Y_i}{W_j} \quad (5)$$

where each $W_j$ is calculated using equation (3). Again, N unknown equations with N unknowns result for each axis, and the load cell positions may thus be calculated using any suitable manner for solving simultaneous equations.

Each load cell may thus be characterized by a unique span correction factor $s_i$ and coordinates, or position correction factors ($X_i, Y_i$). Preferably, calibration process for obtaining all of this data is performed simultaneously, using a single known weight placed at N known positions on the operating surface. The span correction factors may then be determined using equations from (3), then the coordinates may be determined using equations from (4) and (5). Other calibration weights, positions, and numbers of datapoints may also be used in the alternative.

Once the characterizing data for the load cells is calculated, the magnitude and position of an unknown force on the operating surface may be calculated in a relatively straightforward manner. For example, an unknown force of magnitude W is shown at coordinates (x,y) in FIG. 3.

As above, the moments about each axis cancel and the total supporting force is equal to the applied weight under static conditions. The magnitude of the unknown force W is $$\sum_{i=1}^{N} F_i s_i,$$

from equation (2) above.

Further, the axial moments, due to the supporting force's distance from each axis, $M_x$ and $M_y$ are:

$$M_x = \sum_{i=1}^{N} F_i X_i s_i \quad (6)$$

$$M_y = \sum_{i=1}^{N} F_i Y_i s_i \quad (7)$$

where $X_i$ and $Y_i$ are the coordinates, or position scaling factors, for each of the load cells, and each term $F_i X_i s_i$ and $F_i Y_i s_i$ are partial axial moments.

The position coordinates of the unknown force (x,y) are determined by dividing (or taking the ratios) of the axial moments by the magnitude of the applied force about the relative fixed reference frame, resulting in the equations:

$$x = \frac{M_x}{W} = \frac{\sum_{i=1}^{N} F_i X_i s_i}{\sum_{i=1}^{N} F_i s_i} \quad (8)$$

$$y = \frac{M_y}{W} = \frac{\sum_{i=1}^{N} F_i Y_i s_i}{\sum_{i=1}^{N} F_i s_i} \quad (9)$$

It will be appreciated that the position coordinates of the unknown weight are not a function of the applied force. However, the resolution of the position calculation may be affected by the magnitude of the applied force, as well as the distribution of the applied weight, force, or impulse and the time allowed for response, and further, the number of load cells used. As few as three load cells may be used to provide two dimensional positional determination, although greater numbers of load cells would provide stability in various platform configurations.

Two load cells disposed along an axis may be used to provide one dimensional positional determination. In this application, only one coordinate is calculated for each load cell (e.g., using equation (4)), and only one coordinate need be calculated for unknown forces (e.g., using equation (8)).

Three dimensional position determination may also be contemplated using four or more load cells disposed in a three dimensional spatial relationship, with an operating surface that is curved to follow a three dimensional profile. Three dimensional position determination would have application as an accelerometer, for example, where a directional force may be determined.

The position and magnitude of impulse forces applied to an operating surface may also be calculated in a similar manner as above, but instead using the relative change in the force measurements by the individual load cells to calculate magnitude in position. For example, by using force change values $\Delta F_i$ representative of the change in force over a period of time, equations (2), (8) and (9) become:

$$W_{imp} = \Delta W = \sum_{i=1}^{N} \Delta F_i s_i \quad (10)$$

$$x_{imp} = \frac{\Delta M_x}{W_{imp}} = \frac{\sum_{i=1}^{N} \Delta F_i X_i s_i}{\sum_{i=1}^{N} \Delta F_i s_i} \quad (11)$$

$$y_{imp} = \frac{\Delta M_y}{W_{imp}} = \frac{\sum_{i=1}^{N} \Delta F_i Y_i s_i}{\sum_{i=1}^{N} \Delta F_i s_i} \quad (12)$$

where $W_{imp}$ is the magnitude of the impulse force, ($x_{imp}$, $y_{imp}$) are the position coordinates of the impulse force, each $\Delta F_i s_i$ term is a span corrected force change value, each $\Delta F_i X_i s_i$ and $\Delta F_i Y_i s_i$ term is a partial change in (or delta) axial moment, and $\Delta M_x$ and $\Delta M_y$ are change in (or delta) axial moments.

The ability to separately calculate impulse magnitudes and positions separately from a static force enables a scale to be used as a form of keyboard or user input device even while an object is being weighed by the scale. Using suitable impulse detection routines (e.g., by requiring a minimum magnitude, by requiring an impulse to occur within a time window, and/or by requiring an impulse to return to the static condition), an impulse as a result of a user input may be distinguished to enable the scale to perform certain operations consistent with its environment, as will be discussed below.

Mechanical Configuration

Figure 4:
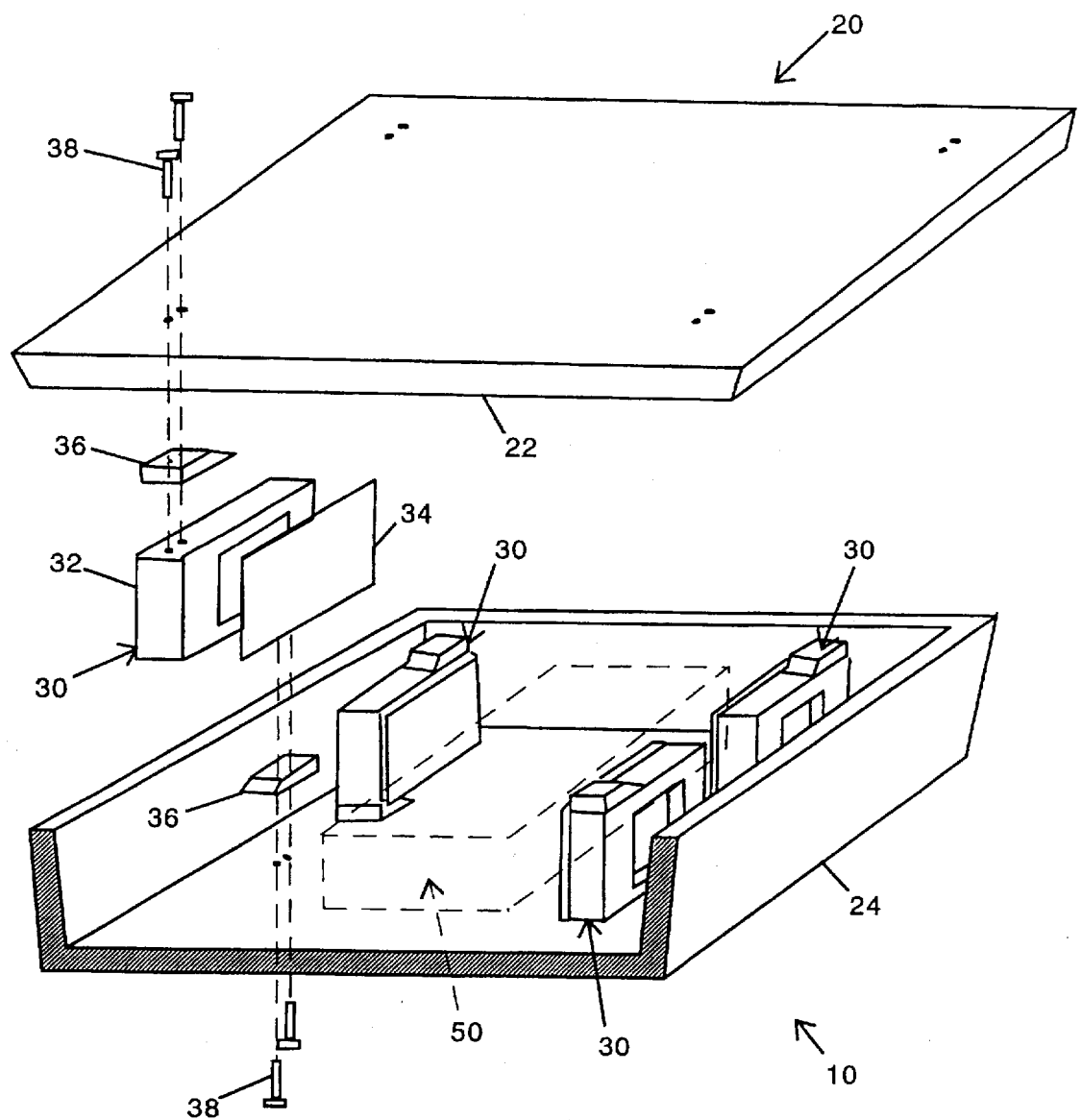
FIG. 4 is a partially cut away and partially exploded perspective view of the apparatus of FIG. 1.

FIG. 4 is a partially cut away and partially exploded perspective view of one suitable mechanical configuration for scale 10, with the forward portion of base 24 (including keyboard 28 and display 26) removed for clarity. Base 24 houses load cells 30 and much of control system 50 (shown in phantom). To this extent, base 24 may take any shape consistent with its function of housing and providing a sturdy support for the components of scale 10.

Platter 22 defines support surface 20, and is supported by load cells 30. The contour and configuration of operating surface 20 (and platter 22) may take many forms depending upon the types of articles weighed, or the types of forces subjected to the operating surface in operation. For example, for three dimensional forces, the operating surface may define a three dimensional object. As discussed above, platter 22 may even be omitted, with the load cells themselves defining the operating surface.

Load cells 30 may be any type of force sensing structure which provides a force value representative of the force applied to the load cell. For example, the preferred load cells are load cell assemblies of the type disclosed in U.S. Pat. No. 5,442,146 to Bell et al., and U.S. Pat. No. 5,313,023 to Johnson, both of which are incorporated by reference herein. This type of load cell assembly generally includes a load cell body 32 with an interior aperture having a base located on one wall thereof. A load beam spans across the aperture from the base, and a pair of cantilevered beams extend from the base generally parallel to the load beam. A pair of force sensors are affixed between the ends of the cantilevered beams and the load beam such that, upon the application of force to the load cell body, one sensor is placed in tension and the other is placed in compression, whereby the sensors provide complementary outputs responsive to the applied force.

Using suitable controller electronics (shown disposed on circuit board 34 secured to the side of load cell body 32), the resonators are driven to oscillate at their respective resonant frequencies, whereby the frequency output signals therefrom may be converted to digital form. The value of the force applied to the load cell body is obtained by taking a scaled difference of the outputs, since the respective resonant frequencies of the resonators will react oppositely to an applied force. By taking the difference of the outputs, many common mode effects, such as due to environmental effects, will be rejected by the subtraction operation. In addition, temperature compensation, as well as other additional signal processing, may be performed to improve the accuracy and precision of the force value output from the load cell assembly. Moreover, a communications function may be incorporated into each load cell controller to permit the load cell assembly to communicate with a master controller over a common load cell bus, as is detailed in Bell et al.

It has been found that the preferred load cell assembly design provides extremely high resolution with reliable rejection of many environmental interferences. Many modifications may be made to this design, including several modifications disclosed in the aforementioned references, including using only one resonator, sealing the aperture with a sealant to protect the force sensors from environmental effects, coating the wire leads from the force sensors with a dampening material, etc.

Other load cells may be used in the alternative, e.g., those disclosed in U.S. Pat. No. 5,336,854 issued to Thomas H. Johnson, which is incorporated by reference herein. Many other alternatives exist, e.g., strain gauge designs, flexured bending beam designs (e.g., by Toledo, Revere, BLH, and others), vibrating string designs (e.g., by K-Tron and others), force motor designs (e.g., by Sartorius, Metler, A&D, Bizerba, and others), capacitive coupling designs (e.g., by Setra and others), piezoelectric crystal designs, tuning fork designs (e.g., by Ishida and others), LVDT inductive force sensors, ultrasonic-based force sensors, magnetostrictive force sensors and force-responsive optical devices.

As shown in FIG. 4, each load cell 30 is preferably mounted between platter 22 and base 24 using a pair of spacers 36 affixed by fasteners 38. Spacers 36 are preferably constructed of a shock resistant material such as phenolic, to protect the load cell from excessive impact forces. Spacers 36 are preferably mounted at opposing ends of the top and bottom surfaces of each load cell body, such that a downward force applied to platter 22 will induce a shear force across the load cell body, which may be sensed and calculated by the load cell controller to generate the force signal output therefrom. Other manners of mounting a load cell, e.g., at the ends, at opposing ends of the top or bottom surface, etc. may be used in the alternative. In addition, stops may be used to limit the deflection of a load cell body to protect the force sensors thereon from failing due to excessive force. Side force isolation devices may also be used to minimize deflection effects between load cells for greater accuracy.

Load cells 30 may be positioned at different points relative to platter 22. The preferred configuration shown in FIG. 4 spaces the effective locations of the load cells (generally proximate the mount between the load cell and the platter) closest to the perimeter of the platter, thereby providing a greater range of responses of the load cells based upon differing positions of an applied force. Other positions for the load cells may be used in the alternative. Moreover, as discussed above, greater or fewer load cells may be used to provide different accuracy, precision and/or resolution, or to provide one or three dimensional position detection of an applied force.

Hardware Configuration

Returning to FIG. 2, the primary hardware components of scale 10 are illustrated. As discussed above, control system 50 provides the primary operational control of the scale, coordinating user interfacing with display 26 and user input 28, and handling communications with load cells 30 over load cell bus 40. Control system 50 also provides a magnitude sensing means and a position sensing means for computing the magnitude and position of an applied force from the force values obtained from the load cells. In addition, an impulse detection means and user input means are provided to detect, process and handle any user impulse forces applied to the scale.

Control system 50 includes a microprocessor or microcontroller and any necessary support circuitry, such as RAM, ROM, power supply circuitry, clocking circuitry etc. One suitable hardware configuration is disclosed in Bell et al., for example, although other known hardware components may also be used.

Control system 50 also preferably includes driving circuitry for controlling display 26. Display 26 will also vary depending upon the particular application, and may include numeric information, alphanumeric information, separate characters or icons, etc., depending upon the information output requirements of the application. Suitable displays include LEDs, LCDs, CRTs, vacuum fluorescent displays, etc. For example, Bell et al. discloses two vacuum fluorescent displays for a counting scale application, as well as the driving circuitry required therefor.

Control system 50 also preferably includes driving circuitry for a user input device such as keyboard 28. User input device 28 will also vary depending upon the particular application. For example, alphanumeric keys, soft (reprogrammable) keys, and function keys may be provided, as well as alternate input devices such as mice, trackballs, touchpads, etc. In addition, since the preferred scale is capable of distinguishing impulse forces and thereby detecting user depressions of platter 22 to enable the platter itself to receive input, a separate user input device may be omitted altogether.

In addition, control system 50 controls communications over load cell bus 40. To this extent, control system 50 preferably includes suitable communications circuitry, e.g., a Universal Asynchronous Receiver/Transmitter (UART), as well as suitable drivers and buffers. Each load cell 30 also includes similar circuitry for receiving and transmitting information over the bus.

Control system 50 and load cells 30 communicate via any known protocol, e.g., the RS485 or RS232 standards, preferably in a master/slave relationship. Each load cell preferably has a unique address which permits the load cell to be individually controlled by the control system. A command set, known by the control system and the load cells, must be developed to enable information and commands to be passed therebetween. The command set may also enable a load cell to be calibrated and characterized with calibration data and other identifying information. One suitable communications protocol is generally discussed in Bell et al.; however, a discussion of the specifics of a suitable command set is not necessary for an understanding of the invention.

Under a master/slave protocol, control system 50 requests each load cell to capture a force reading and output a force signal to the control system for calculating the magnitude and position of an applied static and/or impulse force. The control system may store the span correction and load cell positions in its memory, or alternatively, the span correction and load cell position data may be stored in each load cell individually, whereby the load cells would provide moment and span corrected values to the control system for calculating the magnitude and position of a force.

Alternatively, a sequential chain communication protocol may be used, whereby each load cell contributes to the calculation of the magnitude and position of an applied force. As discussed above, the position and magnitude of an applied force is generally calculated using equations (2), (8) and (9) for static forces, and equations (10), (11) and (12) for impulse forces. Each of these calculations includes a summation of partial data calculated from each load cell. By breaking the summations down into individual operations, each load cell may receive a partial result from a prior load cell, add its component, then pass the updated partial result to the next, or subsequent, load cell for a similar operation. The value returned by the last load cell in series then contains the full calculations.

For example, for any load cell n, the summations in equations (2), (8) and (9) above may be represented as:

$$W_n = W_{n-1} + F_n s_n \quad (13)$$

$$x_n = \frac{M_{xn}}{W_n} = \frac{M_{x(n-1)} + F_n X_n s_n}{W_{n-1} + F_n s_n} \quad (14)$$

$$y_n = \frac{M_{yn}}{W_n} = \frac{M_{y(n-1)} + F_n Y_n s_n}{W_{n-1} + F_n s_n} \quad (15)$$

where:

$$W_{n-1} = \sum_{i=1}^{n-1} F_i s_i \quad (16)$$

$$M_{x(n-1)} = \sum_{i=1}^{n-1} F_i X_i s_i \quad (17)$$

$$M_{y(n-1)} = \sum_{i=1}^{n-1} F_i Y_i s_i \quad (18)$$

Therefore, any given load cell may contribute to the calculation of a static force magnitude and position by calculating partial values and adding the values to the results provided from the earlier load cells in series.

Calculation of the impulse magnitude and positions may also be carried out in a similar manner, replacing force readings F with change in force readings $\Delta F$. Equations (13)–(15) then become:

$$W_{imp\ n} = W_{imp(n-1)} + \Delta F_n s_n \quad (19)$$

$$x_{imp\ n} = \frac{\Delta M_{xn}}{W_{imp\ n}} = \frac{\Delta M_{x(n-1)} + \Delta F_n X_n s_n}{W_{imp(n-1)} + \Delta F_n s_n} \quad (20)$$

$$y_{imp\ n} = \frac{\Delta M_{yn}}{W_{imp\ n}} = \frac{\Delta M_{y(n-1)} + \Delta F_n Y_n s_n}{W_{imp(n-1)} + \Delta F_n s_n} \quad (21)$$

where:

$$W_{imp(n-1)} = \sum_{i=1}^{n-1} \Delta F_i s_i \quad (22)$$

$$\Delta M_{x(n-1)} = \sum_{i=1}^{n-1} \Delta F_i X_i s_i \quad (23)$$

$$\Delta M_{y(n-1)} = \sum_{i=1}^{n-1} \Delta F_i Y_i s_i \quad (24)$$

Again, any given load cell may contribute to the calculation of an impulse force magnitude and position by calculating partial values and adding the values to the results provided from the earlier load cells in series.

It will be appreciated that the position variables $x_n$, $y_n$, $x_{imp\ n}$ and $y_{imp\ n}$ need not be calculated or passed from load cell to load cell. Rather, only the axial moments and total force values, $W_n$, $M_{xn}$, $M_{yn}$, $W_{imp\ n}$, $\Delta M_{xn}$ and $\Delta M_{yn}$ need be passed from cell to cell, whereby the positional data may be computed at any time by dividing the axial static and impulse moments by the total static and impulse forces, respectively, as in equations (8), (9), (11) and (12).

Figure 5:
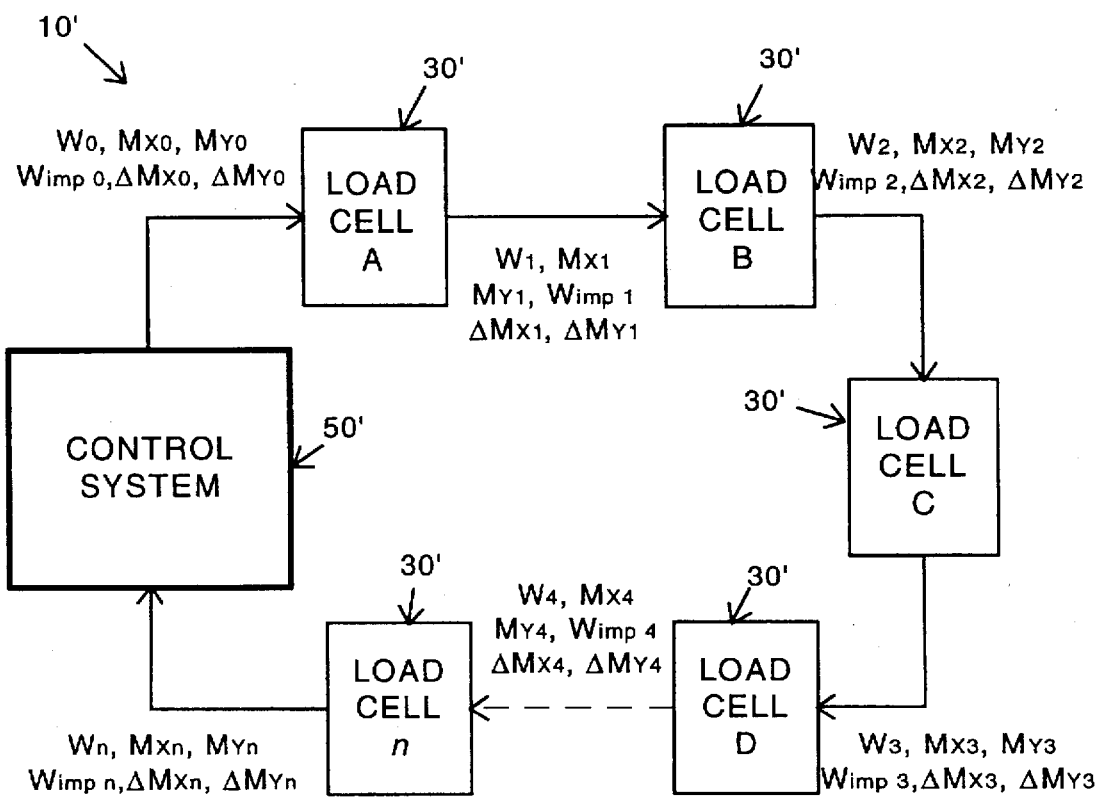
FIG. 5 is a functional block diagram an alternate communication protocol for the apparatus of FIG. 1.

FIG. 5 shows a functional representation of the sequential communications protocol for a scale 10' having a control system 50' and a plurality of load cells 30'. To calculate static and impulse forces, control system 50' initiates a capture by sending a command to load cell A, passing initial partial values for the total static and impulse forces ($W_O$ and $W_{imp\ o}$) and the axial static and impulse moments ($M_{xo}$, $M_{yo}$, $\Delta M_{xo}$, $\Delta M_{yo}$) to the load cell. Null values are initially stored in these variables, thereby enabling the implementing software for each load cell to operate in substantially the same manner. Once the partial values are received by load cell A, the load cell generates a force signal and a force change signal, and adds partial values for the static and impulse forces and axial moments. Then load cell A sends a command to load cell B with the updated partial values, now designated $W_1$, $W_{imp\ 1}$, $M_{x1}$, $M_{y1}$, $\Delta M_{x1}$, $\Delta M_{y1}$. Similarly, load cell B passes updated values to load cell C, load cell C passes updated values to load cell D, etc., until the final load cell in series, n, passes total values $W_N$, $W_{imp\ N}$, $M_{xN}$, $M_{yN}$, $\Delta M_{xN}$, $\Delta M_{yN}$ to control system 50'. The magnitudes are known, and the positions are calculated by control system 50' by dividing the axial moments by the magnitudes as detailed above.

Figure 6:
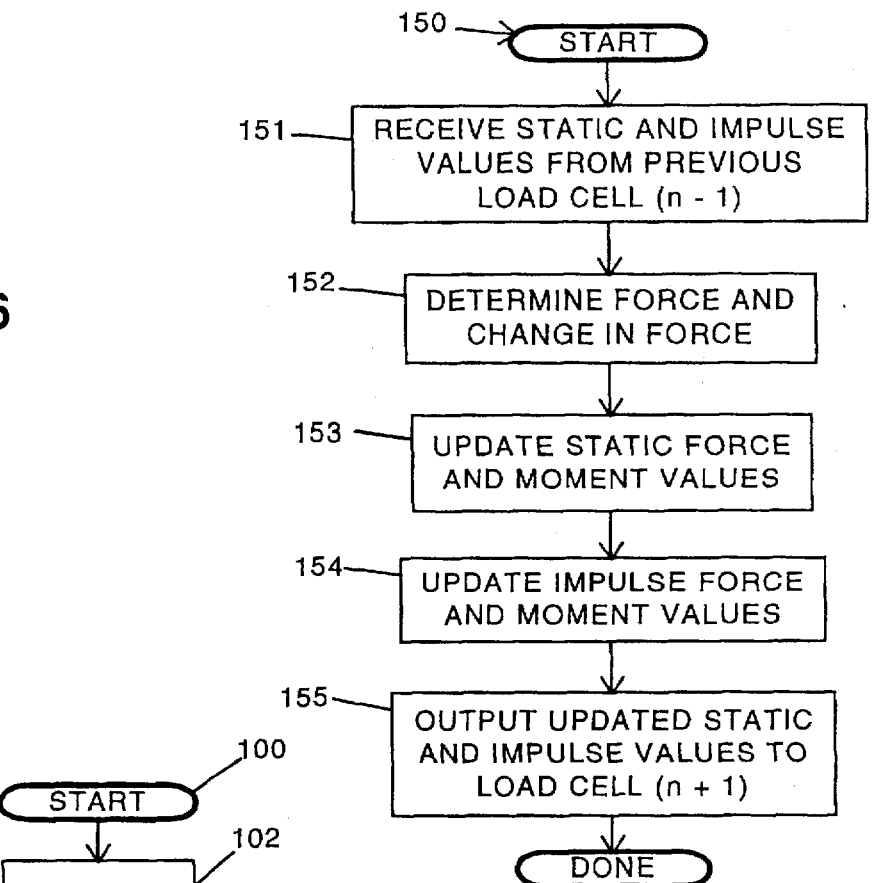
FIG. 6 is a flowchart showing the load cell controller program flow for implementing the communication protocol of FIG. 5.

FIG. 6 shows a flowchart of a suitable program routine 150 for each load cell controller to provide the above described sequential protocol. Routine 150 is preferably activated by a received command requesting an update from the particular load cell n, which will generally be initiated by a prior load cell in series n−1.

The first step in routine 150 is to obtain the prior static and impulse partial values from load cell n−1 in block 151. A force value $F_n$ and a change in force value $\Delta F_n$ are then calculated by the load cell in block 152. Next, in blocks 153 and 154, the partial values of the magnitudes and axial moments are updated, using equations (13)–(15) and (19)–(21) as discussed above. Then, in block 155, the updated values are output in conjunction with a command to the next load cell in series, designated n+1.

Similar routines are used in each load cell 30', with control system 50' acting as the first and last load cells on the network to harmonize the routines in each load cell. With each load cell having a unique address, as well as a unique span correction factor and unique load cell position data, the same basic operations may be used on each load cell to provide reliable data. Moreover, if a load cell is added or removed from the series connection, the routines will still provide reliable data to control system 50' if mechanical considerations are made and the system is recalibrated.

It will be appreciated that other communication protocols may be used in the alternative. Further, different aspects of the position and magnitude calculations may be allocated between the control system and the load cell controllers, including snap commands which cause all of the load cells to store instantaneous readings for final weight and position calculations.

Software Configuration

Figure 7:
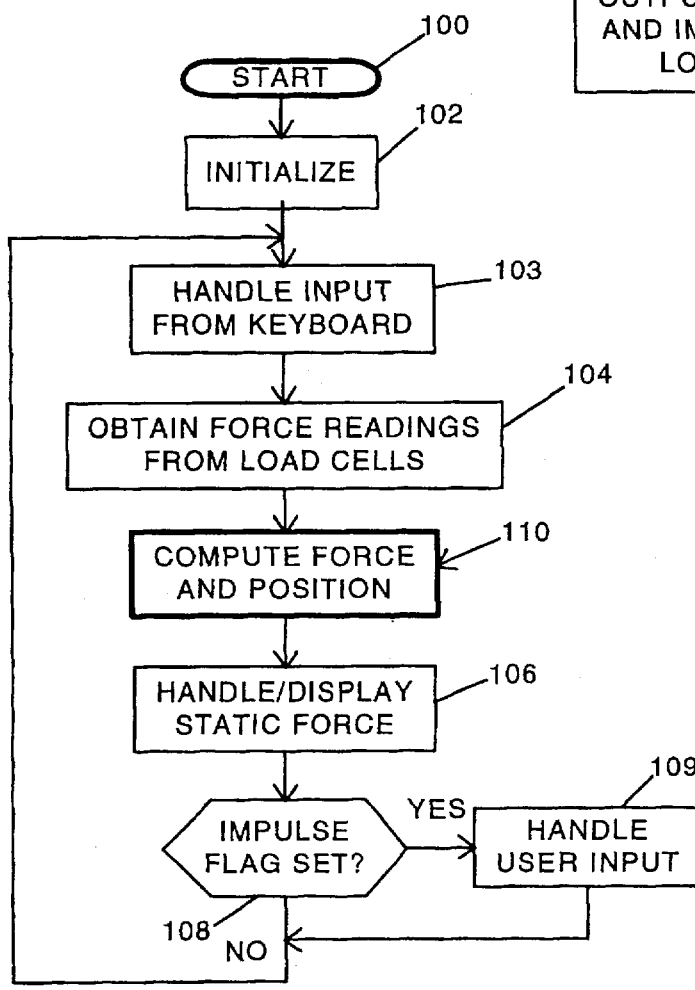
FIG. 7 is a flowchart showing the primary program flow for the control system in the apparatus of FIG. 1.

FIG. 7 shows a main routine 100 for control system 50 of scale 10. Upon power-up, or after a reset, routine 100 will enter an initialization block 102 for initializing variables, setting up interrupts, and performing other start up operations to initialize the scale for operation.

A main loop is represented by blocks 102–110, which is cycled through continuously. First, in block 103, any user input on user input device 28 may be handled by the control system, if such a device is included on the scale. The user input will vary depending upon the particular application, e.g., entering part numbers or weights on a counting scale, etc.

Next, in block 104, force readings are obtained from each of the load cells, preferably by passing a command over the load cell bus to the load cells, then obtaining the current force readings from each load cell over the bus. As a result of this operation, current force readings are obtained from each load cell.

Figure 8:
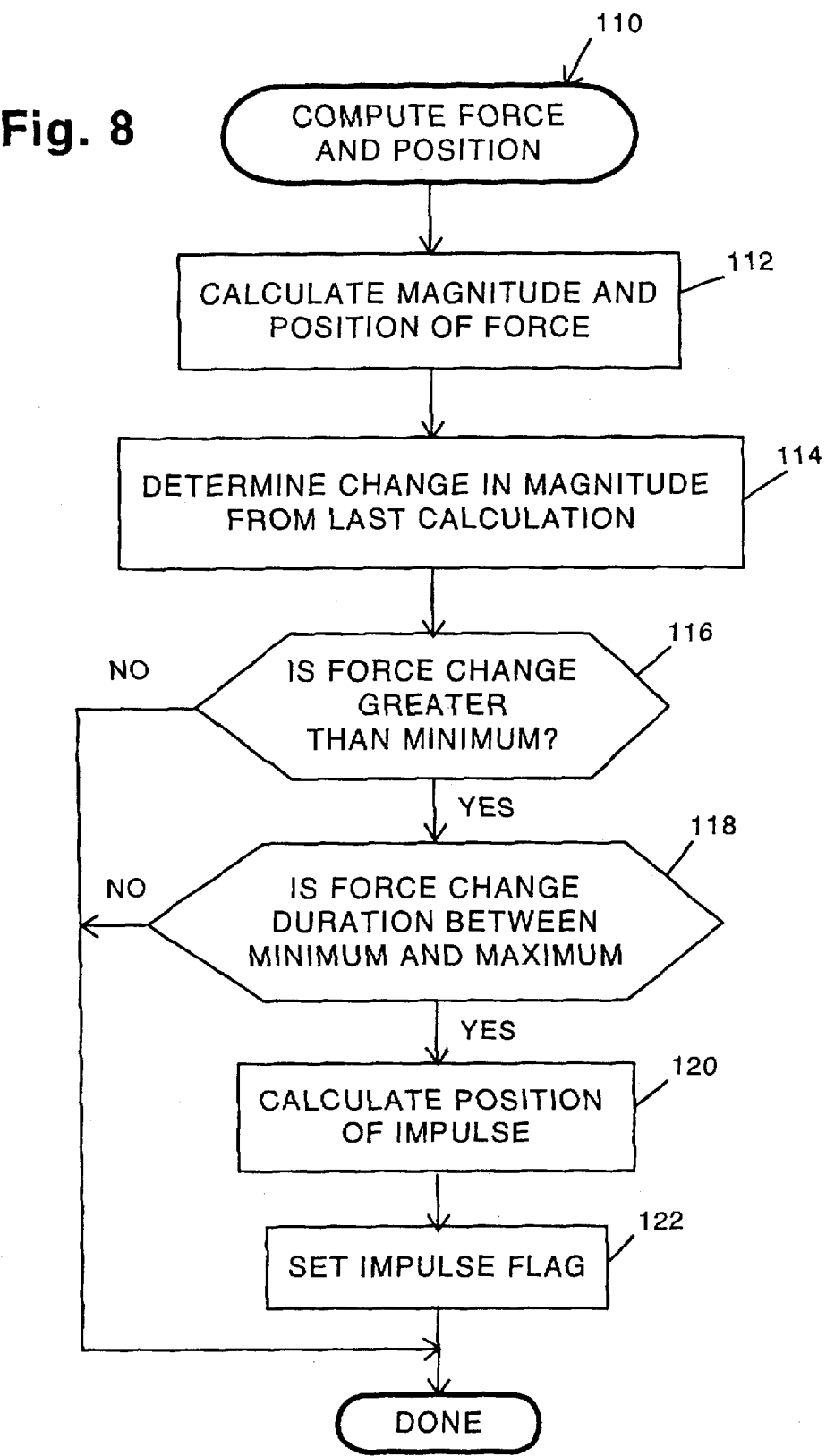
FIG. 8 is a flowchart of the COMPUTE FORCE AND POSITION routine in the program flow of FIG. 7.

Next, a COMPUTE FORCE AND POSITION subroutine 110 is executed to determine the magnitude and position of the applied force to the scale. In addition, impulse detection is performed in this routine, whereby an IMPULSE flag may be set if an impulse is detected. This routine is shown in greater detail in FIG. 8.

In block 112 of routine 110, the magnitude and position of the applied static force on the scale is calculated, e.g., by inputting the force readings obtained from the load cells in equations (2), (8) and (9) discussed above.

In block 114, the change in magnitude of the applied force is compared to determine whether an impulse has occurred. This may be performed by comparing the static force value with a stored value from an earlier time frame, or may be performed by determining the changes in the force readings from earlier stored values, then using equation (10) above to determine the magnitude of the force change.

Next, in blocks 116 and 118, the force change is analyzed to determine if the change represents a valid impulse. In the preferred embodiment, the magnitude of the force change is compared with a minimum magnitude value, and the duration of the force change is compared with minimum and maximum values to determine if the change occurred within a "window" representative of impulses.

Other manners of detecting an impulse may also be used, e.g., determining whether the force decays back to the original force value, integrating a change over time, etc. In addition, a routine for filtering the impulse from the static force value may also be used.

If a force change does not meet the criteria established in blocks 116 and 118, routine 110 terminates and returns to routine 100. Otherwise, if a valid impulse is detected, control passes to block 120 to calculate the position of the impulse, e.g., using equations (11) and (12) above. Then, in block 122, an IMPULSE flag is set to indicate to the main routine that an impulse has been detected. Control then returns to routine 100.

Returning to FIG. 7, once the magnitude and position of an applied force is determined in block 110, control passes to block 106 to handle and/or display the static force information. This routine will in general handle the applied force data, which usually will encompass converting the force into appropriate units and displaying the force on display 26. In some environments, other processing may be performed, e.g., computing a rate in a postal scale based upon the position and magnitude of the force, calculating the number of pieces in a counting scale, etc. For example, several applications are discussed below which require specific processing of the force data.

Once the static force information is handled, control passes to block 108 to determine if an impulse was detected by routine 110. If not, control returns to block 103 to initiate the primary program loop again. If an impulse was detected (from the status of the IMPULSE flag), then control passes to block 109 to handle the impulse.

An impulse (user input) is handled in block 109 consistent with the particular application or environment of the scale, using the magnitude and/or position of the impulse to determine the particular operations to perform. For example, different locations on the operating surface may be designated and labeled for user input, thereby forming a "keyboard" on the operating surface, whereby an impulse located at one of the locations will prompt the control system to perform a specified function (e.g., zero the scale, enter a tare weight, store a force, etc.). An impulse may also indicate that an object has been placed on the scale, e.g., to prompt the scale to calculate a postal rate, to determine the compliance of a part with specifications, etc. Other functions may be performed in response to an impulse depending upon the particular application or environment of use.

After an impulse is handled in block 109, control returns to block 103 to initiate another pass of the main program loop. Other functions, operations, etc. may be performed in the main program loop. In addition, many of the aforementioned operations, e.g., communicating with the load cells over the load cell bus, driving the display, receiving input from the keyboard, etc., may be handled in separate interrupts. In addition, various diagnostic, calibration, setup, etc. routines may be provided in the control system of scale 10.

Other modifications to the preferred routines may be made consistent with the invention. For example, the load cells may either return the force reading data, or may perform some partial calculations (e.g., span or position correction) and return the partial results to the scale control system. In addition, as discussed above, the load cells may also perform the actual position and magnitude calculations and return the results to the scale. Therefore, it will be appreciated that the position and magnitude calculations described herein may be allocated in various manners between the load cells and the scale control system.

Applications

The ability to determine the magnitude and position of static and impulse applied forces has many applications in a number of environments. One such application is for use as a user input device, or keyboard. The principles of the invention may be used to provide a user input function in addition to a weighing or force sensing function, or simply to provide a user input function by itself.

Figure 9:
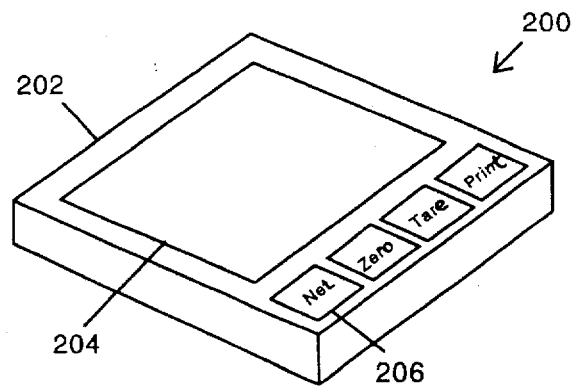
FIG. 9 is a functional perspective view of one embodiment of the invention, having a plurality of keys defined on an operating surface thereof.

For example, FIG. 9 shows a device 200 having an operating surface 202. A weighing area 204 and one or more predetermined areas or keys 206 are marked on the operating surface. Each key 206 may have a label designating its particular function, e.g., "net", "zero", "tare", "print", etc. By defining the areas of each "key" in terms of coordinates on the operating surface, suitable software can determine which key was activated by an impulse force from a user to activate the corresponding predetermined operations on the device for the selected key. Any number, size and shape of keys may be defined on the operating surface as long as suitable coordinates may be developed therefor. In fact, a separate weighing area 204 is optional since the entire surface may be covered with keys, as an object to be weighed may be placed anywhere on the operating surface, independent of the keys.

The keys may be activated by pressing with the hands or fingers. Alternatively, in the case of a truck or platform scale, the keys may be activated by stepping on a designated area of the scale or moving from one position to another.

Figure 10:
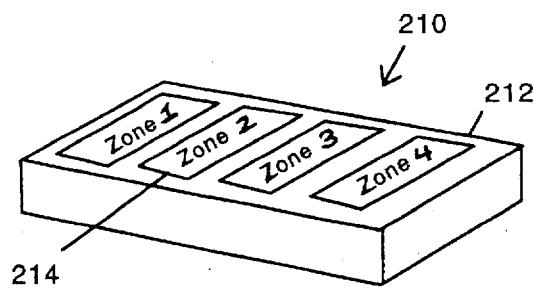
FIG. 10 is a functional perspective view of another embodiment of the invention for use as a sorting device.

FIG. 10 illustrates another application directed to sorting devices, where different functions or modes of operation are initiated based upon the position of an object on the device. For example, a device 210 shown in FIG. 10 may be used as a postal sorter, with a plurality of zones 214 defined on an operating surface 212. By placing a package to be shipped on the appropriate zone corresponding to its destination, device 210 may calculate and print out a label containing the correct postage, as a function of both the weight and the destination of the package. FIG. 10 also illustrates a two load cell embodiment of the invention, where two oppositely disposed load cells may be used to determine positioning along a single axis.

Other sorting applications may be envisioned, such as density or type sorters, the latter having different areas on the operating surface defined for different parts or pieces. Separate compartments for holding the parts may also be provided at predefined places on the surface. By placing parts on appropriate regions of the operating surface, a device may be able to customize its function for a particular part. For example, in a counting scale application, placing a group of like parts on their appropriate region of the surface may enable the counting scale to automatically recall the piece weight of the parts for calculating the number of parts in the group. Further, a running total of different types of parts may be maintained from batch to batch.

Figure 11:
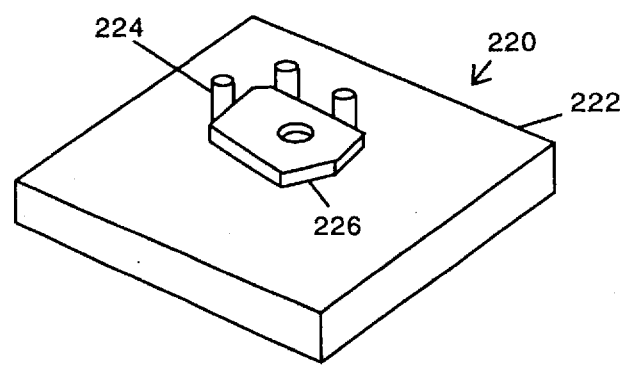
FIG. 11 is a functional perspective view of another embodiment of the invention for use as a quality control comparison device.

Another application is a comparison device for use in quality control to determine compliance of unknown parts with a specification. For example, device 220 in FIG. 11 includes a fixture such as a plurality of fixed pins 224 disposed on operating surface 222. An unknown object 226 may be placed against pins 224, and its center of gravity and total weight may be determined. A comparing routine is used to detect any deviations in weight or position (i.e., center of gravity) from predetermined values corresponding to a standard piece or specification (e.g., if a piece had misplaced components or was out of tolerance). In addition, sealed boxes may be analyzed in a similar manner, e.g., to determine if parts are missing from a box. Thus, device 220 may operate as a non-intrusive comparative tester. This type of scale could have many different fixtures for positioning objects to be compared to standards.

Figure 12:
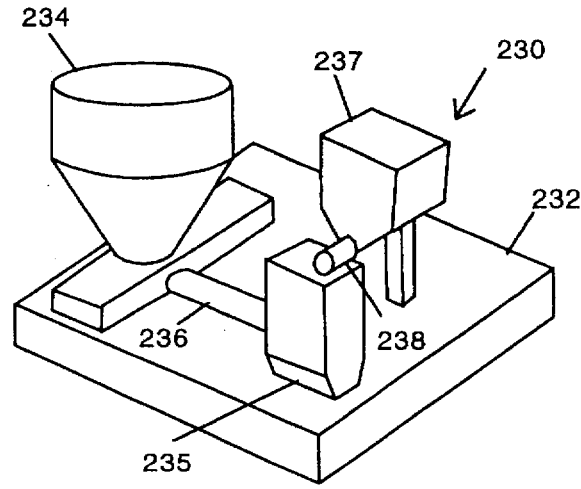
FIG. 12 is a functional perspective view of another embodiment of the invention for use as a process control device.

An additional application is in the area of process control, as exhibited by device 230 in FIG. 12. Device 230 includes process equipment disposed on an operating surface 232. The process equipment, for example, may be equipment for transporting material from a surge tank 237, to a hammer mill 235 using an auger 238, and to a mixer 234 using an auger 236. By using a suitable status routine to detect the magnitude and center of gravity of the material in the process equipment, the material may be followed from station to station in a non-intrusive manner. No separate monitors or sensors are required, and the equipment enclosures need not be opened or modified.

Preferred embodiments of the invention may have utility in many other applications and environments of use, e.g., in other scale/sorting applications. Further, any combination of the above functions (e.g., center of gravity, keyboard, sorter, center of gravity movement detection, etc.) may also be implemented in a particular application, and any area on a support surface may be defined to function in any or all of these ways (e.g., a process control system may have a keyboard entry area on the supported structure). Thus, the invention should not be limited by the particular applications and use environments disclosed herein.

It will therefore be appreciated that the invention may provide a number of benefits and advantages as a result of determining the position, as well as the magnitude, of an applied force. As various changes and modifications may be made to the preferred embodiments without departing from the spirit and scope of the invention, the invention therefore resides in the claims hereinafter appended.

What is claimed is:

1. A force sensing apparatus, comprising:
   an operating surface for receiving an applied force, the applied force having a position relative to the operating surface and a magnitude;
   a plurality of load cells, each load cell receiving at least a portion of the applied force on the operating surface and providing a force value representative thereof;
   means for determininq both the magnitude of the applied force and the position of the applied force on the operating surface based on the force values generated by load cells; and
   means for outputting a first signal corresponding the magnitude of the applied force and a second signal corresponding to the position of the applied force.

2. The apparatus of claim 1, wherein the plurality of load cells includes first, second and third load cells, each having a position relative to the operating surface, and wherein the position sensing means determines the position of the applied force in two dimensions.

3. The apparatus of claim 2, wherein the operating surface is disposed on a platter, wherein the plurality of load cells includes a fourth load cell, and wherein the load cells are mounted to the platter at spaced apart positions proximate an outer perimeter of the platter.

4. The apparatus of claim 1, wherein each load cell includes:
   (a) a load cell body adapted to receive a force;
   (b) first and second force sensors, mounted in the load cell body to provide complementary outputs in response to the force received by the load cell body; and
   (c) a load cell controller, coupled to the force sensors, for generating the force value.

5. The apparatus of claim 1, wherein the magnitude sensing means includes span correction means for scaling the force value of each load cell by a span correction factor to generate a span corrected force value.

6. The apparatus of claim 5, wherein each span correction factor is a constant representative of errors due to mounting effects on a respective load cell.

7. The apparatus of claim 5, wherein the magnitude sensing means further includes summing means for summing the span corrected force values to generate the magnitude of the applied force.

8. The apparatus of claim 7, wherein the position sensing means includes:
   (a) position scaling means for scaling the span corrected force value for each load cell by a position scaling factor to generate a partial axial moment;
   (b) summing means for summing the partial axial moments to generate an axial moment; and
   (c) dividing means for dividing the axial moment by the magnitude generated by the magnitude sensing means to generate the position of the applied force.

9. The apparatus of claim 8, wherein each position scaling factor is a constant representative of an effective position of a respective load cell relative to the operating surface.

10. The apparatus of claim 8, wherein the position scaling means, the summing means and the dividing means provide a first position coordinate for the applied force along a first axis, and wherein the position sensing means further includes:

(a) second position scaling means for scaling the span corrected force value for each load cell by a second position scaling factor to generate a second partial moment;
   (b) second summing means for summing the second partial axial moments to generate a second axial moment; and
   (c) second dividing means for dividing the second axial moment by the magnitude generated by the magnitude sensing means to generate a second position coordinate for the applied force along a second axis.

11. The apparatus of claim 1, further comprising a master controller coupled to the load cells through a sequential network such that each load cell has a prior and a subsequent load cell on the network, with the master controller acting as the first and last load cell in the network, and wherein each load cell includes:
   (a) receiving means for receiving a magnitude and an axial moment from the prior load cell on the network;
   (b) span correction means for scaling the force value of the load cell by a span correction factor to generate a span corrected force value;
   (c) magnitude updating means for summing the span corrected force value with the magnitude to generate an updated magnitude;
   (d) position scaling means for scaling the span corrected force value of the load cell by a position scaling factor to generate a partial axial moment;
   (e) position updating means for summing the partial axial moment with the axial moment to generate an updated axial moment; and
   (f) transmitting means for transmitting the updated magnitude and axial moment to the subsequent load cell on the network;
   wherein the magnitude sensing means includes means for receiving the updated magnitude from the last load cell to generate the magnitude of the applied force, and wherein the position sensing means includes means for dividing the updated axial moment from the last load cell by the updated magnitude from the last load cell to generate the position of the applied force.

12. The apparatus of claim 1, further comprising impulse detecting means for detecting an impulse force applied to the operating surface.

13. The apparatus of claim 12, wherein the impulse detecting means includes impulse magnitude sensing means for sensing the magnitude of the impulse force, the impulse magnitude sensing means including:
   (a) force change generating means for generating a force change value for each load cell representative of the change in force applied to the load cell over a period of time;
   (b) span correction means for scaling the force change values of each load cell by a span correction factor to generate a span corrected force change value; and
   (c) summing means for summing the span corrected force change values to generate the magnitude of the impulse force.

14. The apparatus of claim 13, wherein the impulse detecting means includes impulse position sensing means for sensing the position of the impulse force, the impulse position sensing means including:
   (a) position scaling means for scaling the span corrected force change value for each load cell by a position scaling factor to generate a partial change in axial moment over the period of time;

(b) summing means for summing the partial change in axial moments to generate a change in axial moment; and (c) dividing means for dividing the change in axial moment by the magnitude generated by the impulse magnitude sensing means to generate the position of the impulse force.

15. The apparatus of claim 14, further comprising user input means, coupled to the impulse detecting means, for performing a predetermined operation in response to an impulse received between predetermined positions on the operating surface; whereby a key is defined on the operating surface.

16. The apparatus of claim 1, wherein the apparatus is a sorting device which performs different functions depending upon the position of the applied force.

17. The apparatus of claim 1, wherein the apparatus is a comparison device including comparing means, coupled to the position and magnitude sensing means, for comparing the position and magnitude of an object supported on the operating surface by predetermined values.

18. The apparatus of claim 17, further comprising a fixture, disposed on the operating surface, for receiving the object at a predetermined position relative to the operating surface.

19. The apparatus of claim 1, wherein the apparatus is a process control device including status means, coupled to the position sensing means, for detecting movement of material through process equipment supported on the operating surface.

20. A scale, comprising:
a platter having an operating surface defined thereon for receiving an applied force, the applied force having a position relative to the operating surface and a magnitude;
a plurality of load cells supporting the platter, each load cell providing a force value representative of at least a portion of the applied force; and
a controller, coupled to receive the force values from the load cells, the controller including:
means for determining both the magnitude of the applied force and the position of the applied force on the operating surface based on the force value of each of the load cells; and
impulse sensing means for detecting an impulse force applied to the platter and for determining the position of the impulse force on the platter.

21. The scale of claim 20, wherein the static force magnitude sensing means includes:
(a) span correction means for scaling the force value of each load cell by a span correction factor to generate a span corrected force value, wherein each span correction factor is a constant representative of errors due to mounting effects on a respective load cell; and
(b) summing means for summing the span corrected force values to generate the magnitude of the weight on the platter.

22. The scale of claim 21, wherein the static force position sensing means includes a first coordinate sensing means for sensing the position of the weight on the platter along a first axis, the first coordinate sensing means including:
(a) first position scaling means for scaling the span corrected force value for each load cell by a first position scaling factor to generate a first partial axial moment, wherein each first position scaling factor is a constant representative of an effective position along the first axis of a respective load cell on the platter;

(b) first summing means for summing the first partial axial moments to generate a first axial moment; and (c) first dividing means for dividing the first axial moment by the magnitude generated by the static force magnitude sensing means to generate the first coordinate of the weight on the platter.

23. The scale of claim 22, wherein the static force position sensing means further includes a second coordinate sensing means for sensing the position of the weight on the platter along a second axis, the second coordinate sensing means including:
(a) second position scaling means for scaling the span corrected force value for each load cell by a second position scaling factor to generate a second partial moment;
(b) second summing means for summing the second partial axial moments to generate a second axial moment; and
(c) second dividing means for dividing the second axial moment by the magnitude generated by the static force magnitude sensing means to generate the second coordinate of the weight on the platter.

24. The scale of claim 23, wherein the impulse position sensing means includes impulse magnitude sensing means for sensing the magnitude of the impulse force, the impulse magnitude sensing means including:
(a) force change generating means for generating a force change value for each load cell representative of the change in force applied to the load cell over a period of time;
(b) span correction means for scaling the force change value of each load cell by the respective span correction factor for the load cell to generate a span corrected force change value; and
(c) first summing means for summing the span corrected force change values to generate the magnitude of the impulse force.

25. The scale of claim 24, wherein the impulse position sensing means further includes:
(a) position scaling means for scaling the span corrected force change value for each load cell by the respective position scaling factor for the load cell to generate a partial change in axial moment of the period of time;
(b) second summing means for summing the partial change in axial moments to generate a change in axial moment; and
(c) dividing means for dividing the change in axial moment by the magnitude generated by the impulse magnitude sensing means to generate the position of the impulse force on the platter.

26. The apparatus of claim 25, further comprising user input means, coupled to the impulse detecting means, for performing a predetermined operation in response to an impulse force received within a predetermined area of the platter; whereby a key is defined on the platter.

27. The apparatus of claim 25, wherein the platter includes a plurality of marked areas defined thereon corresponding to different functions for the scale, wherein the user input means performs the functions in response to impulse forces detected in the marked areas, and wherein the impulse position sensing means operates substantially independently of the magnitude and position of a static force applied to the platter.

28. A method of operating a multi-load cell scale having a platter supported by a plurality of load cells, the method comprising the steps of:

(a) sensing the weight of an object placed on the platter;

(b) determining the position of a user impulse applied to the platter; and (c) performing a predetermined function in response to a user impulse received in a predetermined area of the platter.

29. The method of claim 28, wherein each load cell provides a force value representative of at least a portion of the applied force on the platter, and wherein the sensing step includes the steps of:

(a) scaling the force value of each load cell by a span correction factor to generate a span corrected force value; and (b) summing the span corrected force values, wherein the sum of the span corrected force values is representative of the weight of the object.

30. The method of claim 29, wherein the sensing step includes the step of determining the position of the object on the platter.

31. The method of claim 30, wherein the step of determining the position of the object on the platter includes the steps of:

(a) scaling the span corrected force value for each load cell by a position scaling factor to generate a partial axial moment, each position scaling factor being representative of the effective location of the respective load cell along an axis defined on the platter;

(b) summing the partial axial moments to generate an axial moment; and (c) dividing the axial moment by the sum of the span corrected force values to generate the position of the object along the axis defined on the platter.

32. The method of claim 31, wherein the step of determining the position of the object on the platter further includes the steps of:

(a) scaling the span corrected force value for each load cell by a second position scaling factor to generate a second partial axial moment, each second position scaling factor being representative of the effective location of the respective load cell along a second axis defined on the platter;

(b) summing the second partial axial moments to generate a second axial moment; and (c) dividing the second axial moment by the sum of the span corrected force values to generate the position of the object along the second axis defined on the platter.

33. The method of claim 31, wherein the determining step includes the steps of:

(a) generating a force change value for each load cell representative of the change in force applied to the load cell;

(b) scaling the force change value of each load cell by the respective span correction factor for the load cell to generate a span corrected force change value;

(c) scaling the span corrected force change value for each load cell by the respective position scaling factor for the load cell to generate a partial change in axial moment;

(d) summing the span corrected force change values to generate a magnitude of the user impulse;

(e) summing the partial change in axial moments to generate a change in axial moment; and (f) dividing the change in axial moment by the impulse magnitude to generate the position of the user impulse on the platter.

34. The method of claim 28, wherein the platter includes a plurality of predetermined areas which are marked with a corresponding function, and wherein the performing step includes the steps of:

(a) determining in which of the predetermined areas the user impulse was received; and (b) performing the function corresponding to the predetermined area in which the user impulse was received.

* * * * *